(12) United States Patent
Bowe et al.

(10) Patent No.: US 7,985,708 B2
(45) Date of Patent: Jul. 26, 2011

(54) METHODS OF MAKING AND USING A CATALYST

(75) Inventors: Michael Joseph Bowe, Preston (GB); David Leslie Segal, Abingdon (GB)

(73) Assignee: CompactGTL plc, Abingdon, Oxfordshire (GB)

( * ) Notice: Subject to any disclaimer, the term of this patent is extended or adjusted under 35 U.S.C. 154(b) by 562 days.

(21) Appl. No.: 11/913,845

(22) PCT Filed: Jul. 7, 2006

(86) PCT No.: PCT/GB2006/050194
§ 371 (c)(1), (2), (4) Date: Nov. 7, 2007

(87) PCT Pub. No.: WO2007/012890
PCT Pub. Date: Feb. 1, 2007

(65) Prior Publication Data
US 2008/0187468 A1    Aug. 7, 2008

(30) Foreign Application Priority Data
Jul. 26, 2005   (GB) .................................. 0515276.4

(51) Int. Cl.
- *B01J 23/00* (2006.01)
- *B01J 21/00* (2006.01)
- *B01J 20/00* (2006.01)
- *B05D 3/02* (2006.01)

(52) U.S. Cl. ........ 502/300; 502/240; 502/332; 502/355; 502/439; 502/527.24; 427/383.1; 427/383.3; 427/383.5; 427/383.7

(58) Field of Classification Search ............... 502/240, 502/300, 332, 355, 415, 439, 527.24; 427/383.1–383.7
See application file for complete search history.

(56) References Cited

U.S. PATENT DOCUMENTS

| | | | | |
|---|---|---|---|---|
| 5,031,290 A * | 7/1991 | Brereton et al. | ................ | 29/6.1 |
| 5,246,738 A * | 9/1993 | Blum | ............................ | 427/387 |
| 5,635,250 A * | 6/1997 | Blum et al. | .................... | 427/387 |
| 5,645,891 A | 7/1997 | Liu | | |
| 5,776,542 A * | 7/1998 | Campana | ...................... | 427/250 |
| 6,123,997 A * | 9/2000 | Schaeffer et al. | .......... | 427/383.7 |
| 6,372,299 B1 * | 4/2002 | Thompson et al. | .......... | 427/456 |
| 6,540,843 B1 * | 4/2003 | Liu et al. | ....................... | 148/243 |
| 6,761,929 B2 * | 7/2004 | Damle | .......................... | 427/238 |
| 6,800,323 B2 * | 10/2004 | Pan | ................................ | 427/243 |
| 6,803,078 B2 * | 10/2004 | Haug et al. | .................... | 427/449 |
| 6,803,138 B2 * | 10/2004 | Seabaugh et al. | ............ | 429/486 |
| 6,890,640 B2 * | 5/2005 | Kelley et al. | ................. | 428/315.5 |
| 6,977,095 B1 * | 12/2005 | Marx et al. | ................... | 427/2.26 |

(Continued)

FOREIGN PATENT DOCUMENTS

DE   19931902 A1   1/2001

(Continued)

*Primary Examiner* — Cam N. Nguyen
(74) *Attorney, Agent, or Firm* — McDermott Will & Emery LLP

(57) ABSTRACT

A catalyst support is made by coating a metal substrate with a solution containing a precursor for a ceramic and an amphiphilic compound, and treating the coating such that it forms a micelle structure. The coating is then treated to form a mesoporous ceramic coating on the metal substrate. The micelle structure acts as a template, so that the pores are of regular size. The active catalytic material can then be deposited in the pores. The metal substrate may for example be a corrugated foil, which can enable reaction heat to be dissipated from hot spots.

13 Claims, 1 Drawing Sheet

U.S. PATENT DOCUMENTS

Figure 1A:
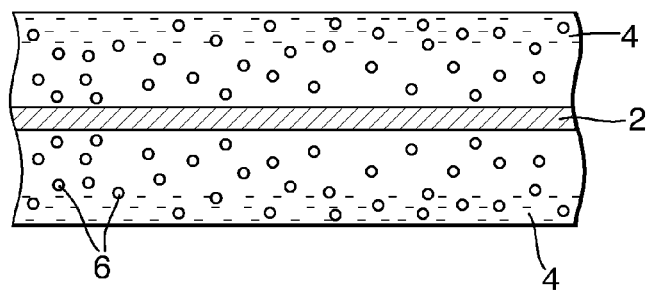

| | | | |
|---|---|---|---|
| 7,056,840 B2 * | 6/2006 | Miller et al. | 438/781 |
| 7,060,329 B2 * | 6/2006 | Kelley et al. | 427/458 |
| 7,078,076 B2 * | 7/2006 | Maze et al. | 427/388.1 |
| 7,150,921 B2 * | 12/2006 | Nelson et al. | 428/626 |
| 7,166,323 B2 * | 1/2007 | Chung et al. | 427/180 |
| 7,214,643 B2 * | 5/2007 | Yamamoto et al. | 502/300 |
| 7,270,852 B2 * | 9/2007 | Kool et al. | 427/383.1 |
| 7,390,536 B2 * | 6/2008 | Ma et al. | 427/402 |
| 7,419,928 B2 * | 9/2008 | Malek et al. | 502/20 |
| 7,531,217 B2 * | 5/2009 | Gleeson et al. | 427/328 |
| 7,629,017 B2 * | 12/2009 | Kodas et al. | 427/58 |
| 7,674,744 B2 * | 3/2010 | Shiratori et al. | 502/327 |
| 2002/0127386 A1 * | 9/2002 | Ogawa et al. | 428/315.5 |
| 2004/0180785 A1 | 9/2004 | Jiang | |
| 2004/0198598 A1 * | 10/2004 | Kawano et al. | 502/349 |

FOREIGN PATENT DOCUMENTS

| | | |
|---|---|---|
| EP | 1123753 A2 | 8/2001 |
| EP | 1123753 A3 | 8/2001 |
| EP | 1123753 B1 | 8/2007 |
| GB | 2322633 A | 9/1998 |
| WO | 0151194 A1 | 7/2001 |
| WO | 03048034 | 12/2003 |
| WO | 2004015167 A2 | 2/2004 |
| WO | 2005011864 A1 | 2/2005 |

* cited by examiner

METHODS OF MAKING AND USING A CATALYST

This invention relates to a catalyst and a catalyst support, to a process for making such a catalyst and a catalyst support, and to a catalytic reactor including such a catalyst. The catalyst may for example be used in Fischer-Tropsch synthesis, for example as part of a process for converting natural gas to longer-chain hydrocarbons.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquids or waxes under ambient conditions. The two stages of the process, steam/methane reforming and Fischer-Tropsch synthesis, require different catalysts, and heat to be transferred to or from the reacting gases, respectively, as the reactions are respectively endothermic and exothermic. Reactors for these reactions may be formed as a stack of plates, with flow channels defined between the plates, the flow channels for the different fluids alternating in the stack. In those channels that require a catalyst, this is preferably in the form of a metal substrate carrying the catalyst in a ceramic coating, such structures being removable from the channels when the catalyst is spent. The catalyst structure provides a large surface area for contact between the reacting gases and the catalytic material. It would be desirable to ensure uniform particle sizes of the active catalytic material, but conventional ceramic supports provide a wide pore size distribution and consequently a wide variation in the sizes of the crystallites of the catalytic metal.

According to the present invention there is provided a process for making a catalyst structure incorporating a metal substrate, the method comprising:
a) preparing a solution containing a solvent and an amphiphilic compound, and a precursor for a ceramic and/or a precursor for a catalytic material, wherein, if the metal does not have a ceramic layer on a surface, the solution contains a precursor for a ceramic;
b) forming a coating of the solution on the substrate;
c) treating the solution such that it forms a micelle structure; and then
d) treating the coating to remove solvent from the solution and hence to form a surface deposit determined by the structure of the micelles.

As a rule, the order in which steps (b) and (c) are carried out is not critical. If the solution contains a precursor for a ceramic then the surface deposit will be a mesoporous ceramic coating. The distribution and size of these pores is determined by the micelle structures in the solution.

Amphiphilic compounds, also referred to as amphiphiles, surface-active agents or surfactants, are molecules which contain at least one polar or hydrophilic group and at least one non-polar or hydrophobic group. In aqueous solution amphiphilic compounds may associate with each other to form structures referred to as micelles. These micelles are often spherical structures in which the hydrophilic groups form the outer surface and the hydrophobic groups form the inner portion. Such micelles are typically formed only above a threshold concentration of the amphiphilic compound, which may be referred to as the critical micelle concentration. The terms "mesopore" and "mesoporous" refer to pores whose diameter is between 2 nm and 50 nm.

To ensure the ceramic bonds securely to the metal substrate it is desirable for the metal to form a stable and adherent oxide surface, and preferably the metal of the substrate is a steel alloy that forms a surface coating of aluminium oxide when heated, for example an aluminium-bearing ferritic steel such as iron with 15% chromium, 4% aluminium, and 0.3% yttrium (e.g. Fecralloy™). When this metal is heated in air it forms an adherent oxide coating of alumina, which protects the alloy against further oxidation and against corrosion. Where the ceramic coating is of alumina, this appears to bond to the oxide coating on the surface.

The metal substrate may be a wire mesh or a felt sheet, but the preferred substrate is a thin metal foil for example of thickness less than 100 µm, and the substrate may be corrugated, pleated or otherwise shaped.

The mesoporous ceramic may subsequently be impregnated with an active catalytic material, for example cobalt in the case of a catalyst for Fischer-Tropsch synthesis, or platinum/rhodium for steam/methane reforming, or palladium/platinum for combustion, or nickel tungsten for hydrocracking; in each case the size of the metal crystallites is important to the activity of the catalyst, and crystallite agglomeration is to be avoided. Alternatively the solution with which the substrate is initially coated may also contain the active catalytic material or a precursor for it. For example the solution may contain an alumina sol-forming salt (as the ceramic precursor), and a salt of the active catalytic material (e.g. cobalt nitrate), in addition to the amphiphilic compound. As another alternative the amphiphilic compound may itself incorporate atoms of the desired catalytic material.

In an alternative the metal substrate is first coated with a porous ceramic layer, for example of alumina, before using the micelle-forming solution. This may for example be by dipping or spraying with a washcoat, drying and calcining. The micelle-forming solution in this case contains the active catalytic material or a precursor for it, and is treated to form a micelle structure before forming the coating of the solution (i.e. step (c) is carried out before step (b)), so that the micelles locate within pores of the porous ceramic layer. The micelles act as a cage for the ions of the catalytically active material (say cobalt) and so enable an optimum amount of cobalt atoms (required to form an optimum sized crystallite) to be applied to each pore of the ceramic layer, provided it is large enough to accommodate the micelle.

Such a catalyst structure incorporating catalytic material may be inserted into a flow channel of a reactor in which flow channels for the reaction alternate with flow channels to remove or provide heat. The metal substrate of the catalyst structure within the flow channels enhances heat transfer and catalyst surface area. The catalyst structures are removable from the channels in the reactor, so they can be replaced if the catalyst becomes spent.

The reactor may comprise a stack of plates. For example, first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. The stack of plates forming the reactor is bonded together for example by diffusion bonding, brazing, or hot isostatic pressing.

The invention will now be further and more particularly described, by way of example only, and with reference to the accompanying drawings in which:

FIGS. 1a to 1e show a sectional view of part of a metal foil at successive stages in the deposition of a catalytic coating; the views are not to scale.

This example uses a foil 2 of Fecralloy alloy of thickness 10 µm as the substrate. The catalytic coating is deposited on both surfaces of the foil by the process described in the following paragraphs, and the foil is then corrugated or otherwise shaped to provide an appropriate catalyst loading and voidage, for example by stacking corrugated and flat foils for insertion into a flow channel of a Fischer-Tropsch reactor. The foil is of the same length as the channel (for example 0.6 m), and the height and width of the foil after it has been corrugated are the same as those of the flow channel (for example 0.1 m by 2 mm). Before being coated, the foil 2 is subjected to heat treatment in air to develop a surface coating of alumina (not shown).

Figure 1B:
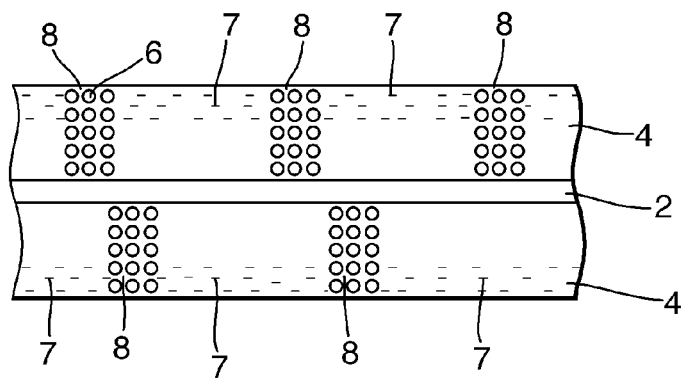

As shown in FIG. 1a, the foil 2 is first coated with a film 4 of an aqueous solution of an aluminium salt containing a small proportion of a lanthanum salt, along with an amphiphilic compound such as cetyltrimethyl-ammonium hydroxide; this solution may also be mixed with an organic compound such as octane. This initial aqueous film 4 is of thickness in the range 100 nm to 5000 nm (0.1-5.0 µm), for example 1 µm. The film 4 is warmed so that, as shown in FIG. 1b, the amphiphilic compound 6 (and the organic compound, if present) forms a structure of micelles for example in the form of hexagonal columns 8 normal to the surface of the foil 2 and with a regular hexagonal spacing. Instead of, or in addition to, this warming, the micelle structure may be formed as a consequence of evaporation of some of the water from the film 4.

Figure 1C:
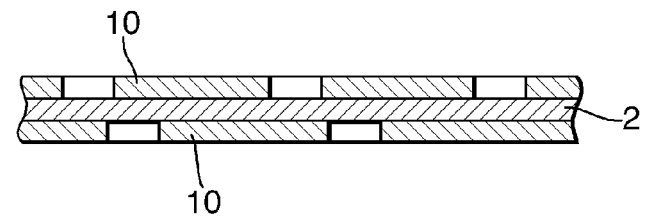
Figure 1D:
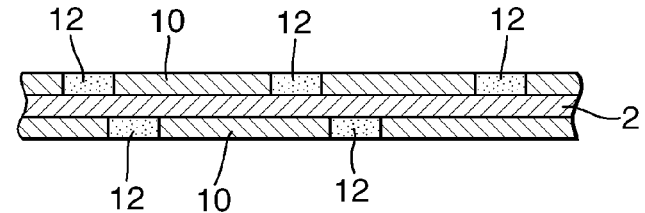
Figure 1E:
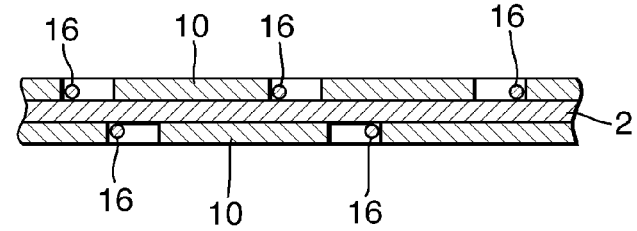

The foil 2 is then subjected to an atmosphere containing gaseous ammonia, which dissolves in the aqueous parts 7 of the film 4 and causes precipitation of hydrated alumina around the micelles, which act as a template. The film is then dried and heated to an elevated temperature, for example 500° C., to decompose the organic molecules and to dehydroxylate the alumina gel, leaving an adherent layer or coating 10 of microporous alumina as shown in FIG. 1c. The porosity has a closely controlled pore size distribution, with a regular hexagonal cell pattern and morphology. Depending on the structure of the amphiphilic compound that forms the micelles, the proportion of the organic compound (if present), and the concentration of the aluminium salt, the pore size can be varied between about 3 nm up to 14 nm. So for example these parameters may be selected such that the pores are of size say 10 to 14 nm. Typically the range of pore sizes is no more than 50% of the mean pore size. The alumina coating 10, after sintering, will be of thickness between 30 nm and 140 nm.

Where it is desired to form a Fischer-Tropsch catalyst, a cobalt salt, along with a smaller proportion (typically between 1% and 5% of the weight of the cobalt salt) of a salt of a promoter such as ruthenium, are dissolved in a solvent such as water or water mixed with acetone, or water combined with a surfactant to reduce surface tension. This solution 12 is applied to the surface of the alumina coating 10, and the solution 12 flows into the pores 14 by capillary action, as shown in FIG. 1d. The alumina is then dried and then calcined under a controlled thermal ramp so that cobalt oxide is formed; the impregnation, drying and calcination steps may be repeated until a desired loading of cobalt oxide is obtained. It is then subjected to a reduction process using a reducing atmosphere containing hydrogen, with a gradual increase in temperature to say 330-450° C. and held at that value for a prolonged time (e.g. 12-36 hours). This procedure results in reduction of over 80% of the cobalt oxide to the metal. Preferably the initial reduction is carried out in an atmosphere containing an inert gas and less than 20% hydrogen, for example argon with 5% hydrogen; the hydrogen concentration is preferably increased towards the end of the reduction process, for example to 100%, and the pressure may also be increased to several bar. The cobalt oxide loading should be such that there is sufficient metal to produce, as shown in FIG. 1e, one or more cobalt crystallites 16 of size approximately 2 to 11 nm within each pore 14 after the reduction process.

The size of the cobalt crystallites 16 is determined by the size of the pores 14 in the alumina coating 10 (both their diameter and their depth) and on the cobalt oxide loading, which depends on the concentration of the cobalt salt solution. The alumina pore size hence acts as a template for the formation of the cobalt crystallites 16. The crystallite size is critical to providing an active, stable and selective Fischer-Tropsch catalyst. If the crystallites are too small they become vulnerable to oxidation and poisoning, as they have very high surface energy, and also tend to form more methane. On the other hand, if the crystallites are too large they have low surface energy, so they are less effective as catalysts (as the low surface energy inhibits the formation of metal surface hydrides and carbides that are the necessary precursors to the initiation of Fischer-Tropsch chain growth). A suitable crystallite size may be in the range 5-10 nm.

The promoter, as described above, may be co-deposited with the catalyst metal, by mixing a small proportion of a salt of the promoter with the solution containing the catalyst metal salt. Consequently the promoter is subjected to calcination and then reduction along with the catalyst metal. The promoter may alternatively be deposited after deposition of the catalyst metal salt, and preferably after the latter has been dried and calcined.

The process described above for producing the microporous ceramic coating is given by way of example only, and may be modified in various ways. For example a salt of aluminium such as aluminium nitrate in the initial solution can be replaced by aluminium chlorohydrate or a denitrated aluminium nitrate solution, so that at least in part it is initially in the form of a sol. The latter can be made for example by thermal treatment of aluminium nitrate, so it is partially decomposed; and then dissolving the residue in water to form the sol.

The diameter of the micelles and so of the columns is determined by the molecular weight and structure of the amphiphilic compound, and the proportion of immiscible organic compound (if present), and this determines the pore size within the material deposited around the micelle structure, and hence the pore size in the resulting ceramic. It will be appreciated that a wide range of different amphiphilic compounds may be used, both anionic and cationic. There are anionic amphiphilic compounds, for example those of the general formula R—O—$SO_3^-$, associated with a small cation such as sodium or hydrogen. Another suitable anionic amphiphilic compound is cobalt AOT (that is to say Co([bis-2-ethylhexyl]-sulphosuccinate)$_2$). There are many different ammonium derivatives, which, like the cetyltrimethyl-ammonium hydroxide described above, are cationic, these being of the general formula $R_4N^{30}$, with a small anion such as hydroxyl; typically three of the Rs would be $CH_3$—, and the fourth R would be a longer chain. The length of the chain R is critical to the behavior of the amphiphilic compound, as in aqueous solution compounds with chain lengths less than C6 tend to be too water-soluble to form micelle structures, while compounds with chain lengths greater than C36 are insufficiently soluble.

Use of gaseous ammonia can be avoided by incorporating a material into the solution which decomposes on warming to release ammonia. Suitable materials would for example be urea, or hexamine (hexamethylenetetramine).

This process can also be followed to produce ceramics that incorporate other oxides such as titania or silica. For example titania salts or sols such as titanium chloride and dichlorinated titanium chloride may be used instead of, or combined with, aluminium salts or sols as discussed above. Similarly a silica sol, such as one derived from a dispersion of flame-hydrolysed powder in water, may be combined with an aluminium salt.

The invention claimed is:

1. A process for making a catalyst structure incorporating a metal substrate comprising a ceramic layer on a surface of the metal substrate, the method comprising:
   a) preparing a solution containing a solvent, an amphiphilic compound, and a precursor for an active catalytic material;
   b) treating the solution to ensure the concentration of the amphiphilic compound is above the critical micelle concentration such that it forms a micelle structure;
   c) forming a coating of the solution on the metal substrate comprising the ceramic layer, wherein steps b) and c) are performed in this order; and then;
   d) treating the coating to remove solvent from the solution and hence to form a surface deposit determined by the structure of the micelles; and then
   e) reducing the precursor for the active catalytic material to a metallic form.

2. A process as claimed in claim 1, wherein the metal of the metal substrate is a steel alloy that forms a surface coating of aluminum oxide when heated.

3. A process as claimed in claim 1, wherein the metal substrate comprises a wire mesh, a felt sheet, or a metal foil.

4. A process as claimed in claim 1, wherein the ceramic layer comprises a porous ceramic layer, and the solution is treated to form a micelle structure before forming the coating of the solution, so that the micelles locate at least partly within pores of the porous ceramic layer.

5. A process as claimed in claim 1, wherein the ceramic layer comprises a mesoporous ceramic coating, and wherein a single metallic crystallite of the active catalytic material is formed within each pore of the mesoporous ceramic.

6. A process as claimed in claim 1, wherein the ceramic layer comprises a mesoporous ceramic coating, and wherein the active catalytic material is deposited as crystallites of size between 2 and 11 nm within the pores of the mesoporous ceramic coating.

7. A process as claimed in claim 6, wherein the metal substrate is subsequently corrugated to locate within a flow channel of a chemical reactor.

8. A process for making a catalyst structure incorporating a metal substrate not having a ceramic layer on a surface of the metal substrate, the method comprising:
   a) preparing a solution containing a solvent, an amphiphilic compound, and a precursor for a ceramic;
   b) forming a coating of the solution on the metal substrate,
   c) treating the solution to ensure the concentration of the amphiphilic compound is above the critical micelle concentration such that it forms a micelle structure; wherein steps b) and c) are performed in this order;
   d) treating the coating to remove solvent from the solution and hence to form a surface deposit comprising a ceramic layer on the metal substrate, wherein the surface deposit is determined by the structure of the micelles; and then
   e) impregnating the surface deposit with a precursor for an active catalytic material; and then
   f) reducing the precursor for the active catalytic material to a metallic form.

9. A process as claimed in claim 8, wherein the metal of the metal substrate is a steel alloy that forms a surface coating of aluminum oxide when heated.

10. A process as claimed in claim 8, wherein the metal substrate comprises a wire mesh, a felt sheet, or a metal foil.

11. A process for making a catalyst, the process comprising making a catalyst structure by a process as claimed in claim 8, wherein the surface deposit comprises a mesoporous ceramic coating, and then impregnating the mesoporous ceramic coating with an active catalytic material wherein a single metallic crystallite of the active catalytic material is formed within each pore of the mesoporous ceramic.

12. A process as claimed in claim 8, wherein the surface deposit comprises a mesoporous ceramic coating, and wherein the active catalytic material is deposited as crystallites of size between 2 and 11 nm within the pores of the mesoporous ceramic coating.

13. A process as claimed in claim 8, wherein the metal substrate is subsequently corrugated to locate within a flow channel of a chemical reactor.

* * * * *